United States Patent
Kast et al.

(10) Patent No.: US 7,318,071 B2
(45) Date of Patent: Jan. 8, 2008

(54) SYSTEM AND METHOD FOR TRANSFERING DATA FROM A SOURCE MACHINE TO A TARGET MACHINE

(75) Inventors: Robert Kast, Succasunna, NJ (US); Kenneth Galipeau, Towaco, NJ (US)

(73) Assignee: EMC Corporation, Hopkinton, MA (US)

( * ) Notice: Subject to any disclaimer, the term of this patent is extended or adjusted under 35 U.S.C. 154(b) by 280 days.

(21) Appl. No.: 10/611,312

(22) Filed: Jul. 1, 2003

(65) Prior Publication Data

US 2004/0243651 A1    Dec. 2, 2004

Related U.S. Application Data

(60) Provisional application No. 60/473,849, filed on May 27, 2003.

(51) Int. Cl.
    *G06F 12/00* (2006.01)
    *G06F 17/00* (2006.01)
(52) U.S. Cl. .............. 707/200; 707/201; 707/202; 707/203; 707/204
(58) Field of Classification Search ......... 707/200–204
    See application file for complete search history.

(56) References Cited

U.S. PATENT DOCUMENTS

| | | | |
|---|---|---|---|
| 5,924,096 A * | 7/1999 | Draper et al. ........... | 707/10 |
| 6,430,577 B1 * | 8/2002 | Hart ........................ | 707/204 |
| 6,430,580 B1 * | 8/2002 | Azagury et al. ........ | 707/206 |
| 6,446,090 B1 * | 9/2002 | Hart ........................ | 707/201 |
| 6,601,076 B1 * | 7/2003 | McCaw et al. ......... | 707/203 |
| 2002/0091909 A1 * | 7/2002 | Nakanishi ............... | 712/10 |
| 2002/0120717 A1 | 8/2002 | Giotta | |
| 2003/0074378 A1 * | 4/2003 | Midgley et al. ........ | 707/204 |
| 2003/0182329 A1 * | 9/2003 | Sato ........................ | 707/204 |
| 2003/0217119 A1 | 11/2003 | Raman et al. | |

\* cited by examiner

*Primary Examiner*—Apu Mofiz
*Assistant Examiner*—Cindy Nguyen
(74) *Attorney, Agent, or Firm*—Van Pelt, Yi & James LLP

(57) ABSTRACT

A system and method are disclosed for providing data transfer between a source machine and a target machine. In one embodiment of the present invention, a method and system for transferring data comprises performing a first operation wherein the first operation copies a first file from a first memory to a second memory, and a second file from the first memory to the second memory, wherein the first file is copied substantially concurrently with the copying of the second file, and wherein the first operation results in a first copied file and a second copied file in the second memory; and performing a second operation wherein the second operation updates the first copied file and the second copied file in a predetermined order.

18 Claims, 5 Drawing Sheets

SYSTEM AND METHOD FOR TRANSFERING DATA FROM A SOURCE MACHINE TO A TARGET MACHINE

CROSS REFERENCE TO RELATED APPLICATIONS

This application claims priority to U.S. Provisional Patent Application No. 60/473,849 entitled OVERLAPPED SYNCHRONIZATION IMPLEMENTATION IN REAL-TIME FILE-LEVEL REPLICATION filed May 27, 2003, which is incorporated herein by reference for all purposes.

FIELD OF THE INVENTION

The present invention relates generally to transferring data. More specifically, a system and method for processing and transferring data from a source machine to a target machine is disclosed.

BACKGROUND OF THE INVENTION

Real-time data replication typically includes two main operations. The first operation is to do a synchronization wherein a machine with data to be replicated, herein referred to as a source, has its data copied in bulk and transferred over to a second computer, herein referred to as a target. The second function can be a real-time replication of the changes to the data from the source to the target.

In performing data replication, it is typically a priority to reproduce the data and the changes to the data in the exact order that occurs in the source to avoid corruption of the data in the target. A problem with such data replication is its lack of efficiency. What is needed is a system and method for transferring data while still avoiding data corruption. The present invention addresses such a need.

SUMMARY OF THE INVENTION

A method for transferring data is disclosed. In some embodiments, a synchronization operation uses a first processing thread to copy a first file from a first data storage to a second data storage, and a second processing thread to copy a second file from the first data storage to the second data storage. The first file is copied substantially concurrently with the copying of the second file, and the first operation results in a first copied file and a second copied file in the second data storage. A real-time replication operation is performed wherein the operation updates the first copied file and the second copied file in an order determined at least in part by an order in which changes were made to the first file and the second file, respectively, as stored in the first data storage.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
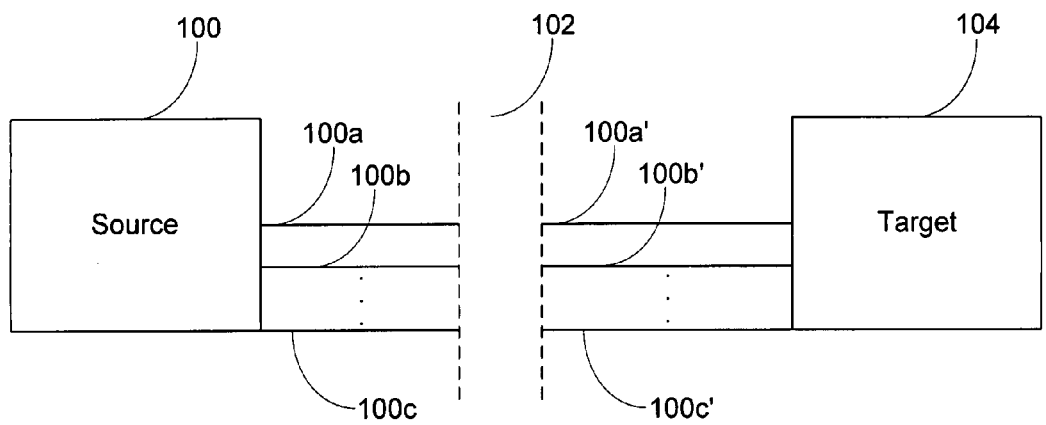
FIG. 1 is a block diagram of a data replication system according to an embodiment of the present invention.

FIG. 1 is a block diagram of a data replication system according to an embodiment of the present invention. In this example, a source machine 100 is coupled with a target machine 104. The source machine 100 and the target 104 are shown to be coupled by a plurality of connections 100A-100C, lOOA'-lOOC' through a network 102, such as a LAN or WAN.

According to an embodiment of the present invention, the efficiency of the data transfer between the source 100 and the target 104 is increased by recognizing that producing the data and the data changes in the exact order in which it occurs at the source 100 is necessary during the real-time replication operation but not during the synchronization operation. Accordingly, the ordering continues to be important during the real-time replication operation, but not during the synchronization operation. Without the constraint of order, multiple connections 100A-100C can now be utilized.

According to an embodiment of the present invention, multiple threads can be used substantially concurrently to process and transfer information such as files. An example of the number of threads for each source 100 is 1-16. A single thread associated with the source 100 is herein referred to as the main site thread, while the other threads are herein referred to as sync threads.

Once the synchronization (sync) begins, at that point, real-time replication can also become active such that if someone changes data during the sync, then the real-time replication commands can be interleaved with the sync commands and queued along with the sync commands. For example, during the sync phase, as file A is being read to be transferred over to the target machine, file A is also being changed on the source machine. In this example, file A is preferably copied over to the target machine first prior to making any changes to file A on the target machine.

Because ordering for all non-sync commands is preferably preserved, the main site thread will preferably be the only thread to the target that will service all commands it encounters for that site. A sync thread, however, will only service commands associated with the sync function, such as SYNC_COPY commands.

During a sync operation if no real-time replication is also occurring, the kernel cache will generally be filled with $SYNC_{13}$ COPY commands. In this case, all site threads (main site thread as well as sync threads) will run down the queue, skipping all $SYNC_{13}$ COPY commands that have been or are being processed by other threads until it finds one that has not yet been processed. The thread will then perform whatever operation is requested for that command (full, incremental, compare attributes, etc.). If a sync thread encounters a non-sync command that has not yet been processed, it will go into a wait state until the main site thread has caught up with it and processed the non-sync command.

If the kernel cache is filled with non-sync commands, such as create, write, attribute, etc., the sync threads will not process these non-sync commands and are not allowed to run in front of the main site thread.

In one embodiment of the present invention, the rules governing the threads are as follows:

The main site thread can process all commands (sync and non-sync).

A sync thread can only process the SYNC_COPY command. However, preferably, the first or last SYNC_COPY command for a sync operation is not processed by the sync thread because it is considered a non-sync command (these denote the start and finish of a sync command and are not associated with any specific file transfer).

A sync thread can advance in the queue up until it encounters the first uncompleted non-sync command for this site. In general, the sync thread does not move ahead of the main thread unless the main thread is also working on a SYNC_COPY command.

The main site thread does not process a non-sync command unless all sync threads for that site have completed any sync commands they have been working on and are waiting on the main site thread to process the non-sync command.

These rules will allow files to be copied in roughly any order, but when a non-sync command is encountered, all site threads will synchronize to the same point before continuing. This behavior increases overhead of normal real-time replication. For this reason, the number of site threads is preferably increased only during sync operations and after the sync operation has finished it will preferably automatically revert to one thread (main site thread). For example, according to one embodiment of the present invention, when five seconds has passed without encountering a sync command, all threads except the main site thread closes.

Figure 2A:
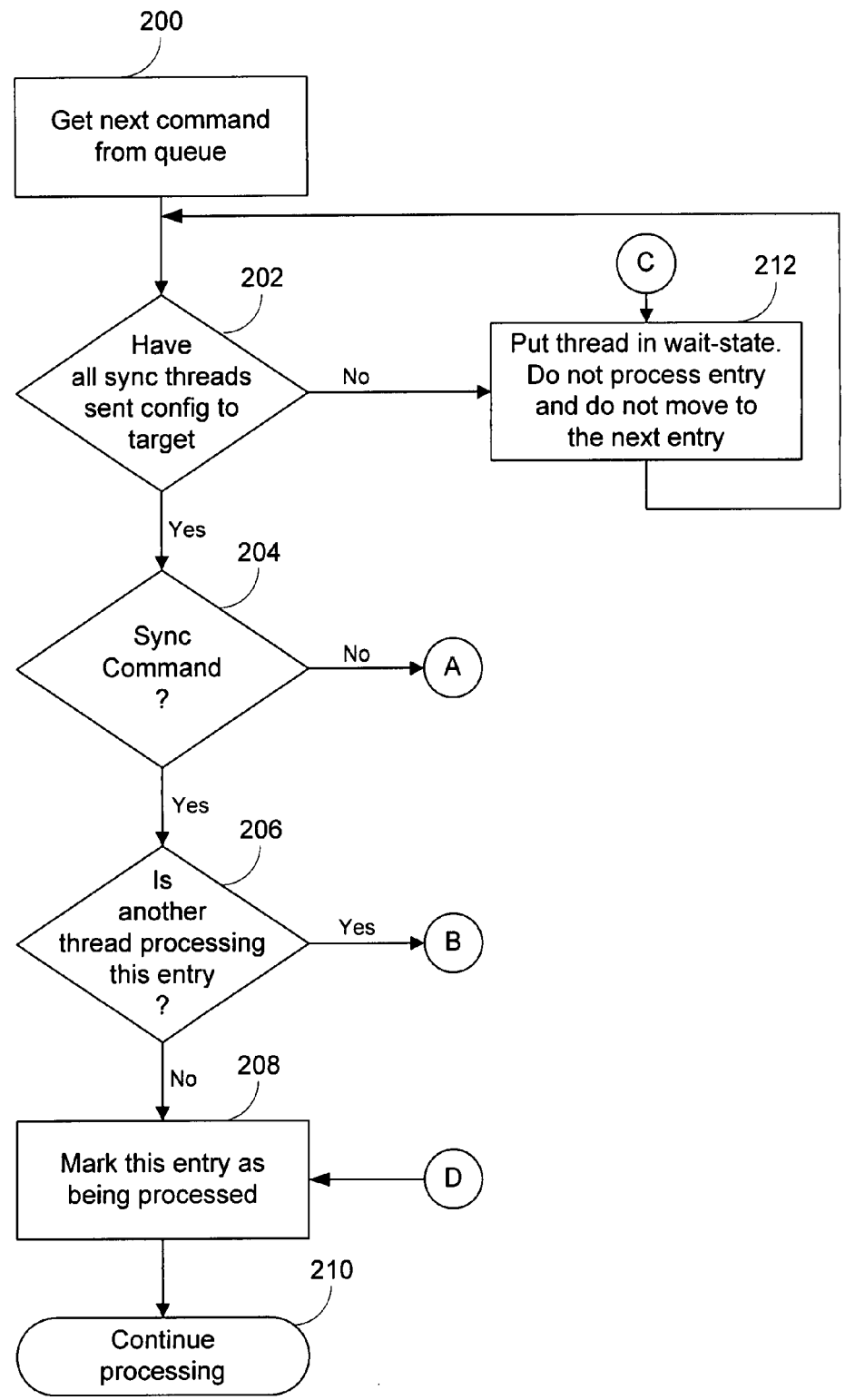
FIGS. 2A-2B are flow diagrams of a method according an embodiment of the present invention for transferring data.
Figure 2B:
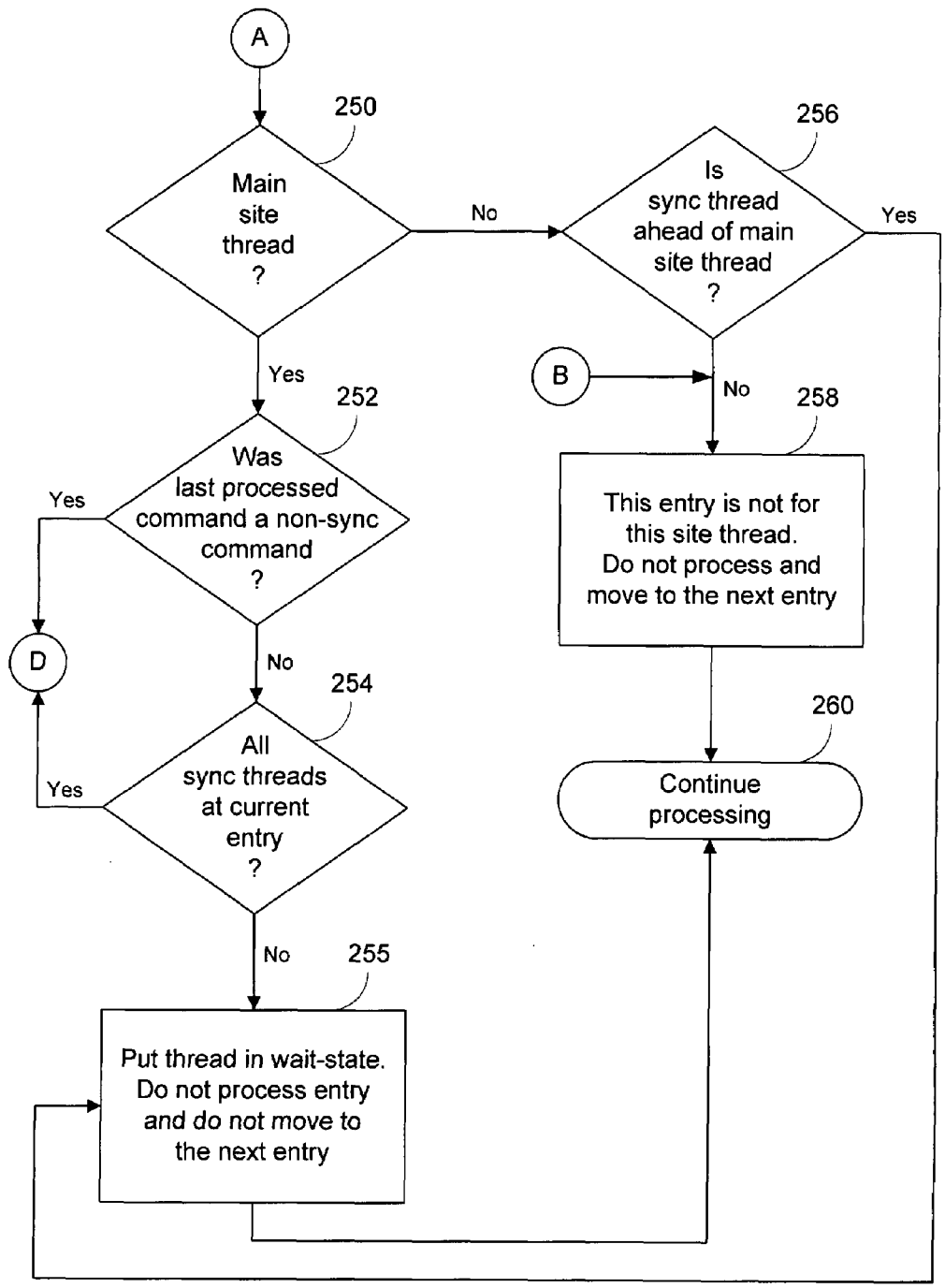

FIGS. 2A-2B are flow diagrams of a method according an embodiment of the present invention for transferring data. In this example, it is assumed that the sync operation has begun, multiple threads have been opened, and commands are waiting in the queue. The examples shown in FIGS. 2A-2B show a method performed by each of the multiple threads.

In this example, the thread retrieves the next command from the queue (200). It is determined whether all sync threads have sent configuration to the target machine (202). The configuration is sent through the thread to the target machine when the sync thread tries to connect to the target machine in order to inform the target machine what it is sending. If all sync threads have not yet sent the configurations to the target, then the thread goes into a wait state and does not process the queue entry and does not move to the next entry (212). Once all of the sync threads have sent their configurations to the target (202), then it is determined whether this particular queue entry is a sync command (204). If it is a sync command, then it is determined whether there is another thread processing this entry (206). If there is no other thread processing this entry, then the entry is marked as now being processed (208). The thread then continues to process the entry (210). For example, the file associated with the entry is transferred from the source machine to the target machine.

If the queue entry is not a sync command (204 of FIG. 2A), then if this thread is a main site thread (250), then it is determined whether the last processed command was a non-sync command (252). If the last command was not a non-sync command, then it is determined whether all sync threads are at the current entry (254).

If all the sync threads are not at the current entry (254), then the thread goes into a wait state. The entry is not processed and the thread does not move to the next entry (255). Once all the sync threads are at the current entry, then the entry is marked as being processed (208 of FIG. 2A), and processing is continued (210). The entry is also marked as being processed (208 of FIG. 2A) if the last processed command was a non-sync command (252 of FIG. 2B) and the thread is a main site thread (250).

If the thread is not a main site thread (250), then it is determined whether a sync thread is ahead of the main site thread (256). If the sync thread is ahead of the main site thread, then the thread is put in a wait state, and the entry is not processed and the thread does not move to the next entry (255). If, however, the sync thread is ahead of the main site thread (256), then this entry is not for this site thread and it is not processed. The thread moves to the next entry (258). Thereafter, processing continues (260).

Figure 3:
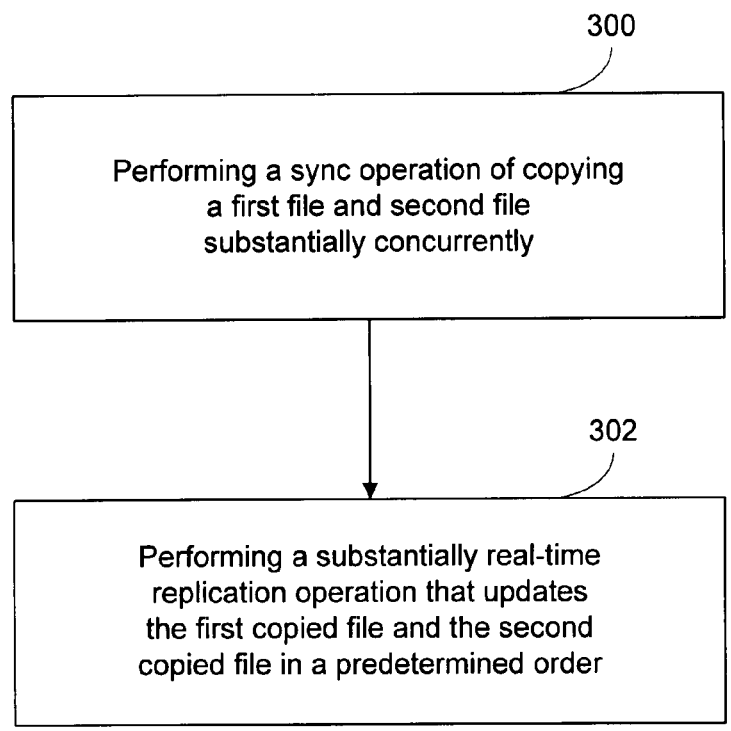
FIG. 3 is another flow diagram of a method according to an embodiment of the present invention for transferring data.

FIG. 3 is another flow diagram of a method according to an embodiment of the present invention for transferring data. In this example, a sync operation is performed wherein a first file and a second file are copied substantially concurrently from the source machine to the target machine (300). Additionally, a substantially real-time replication operation is performed such that the first copied file and the second copied file are updated in a predetermined order.

Figure 4:
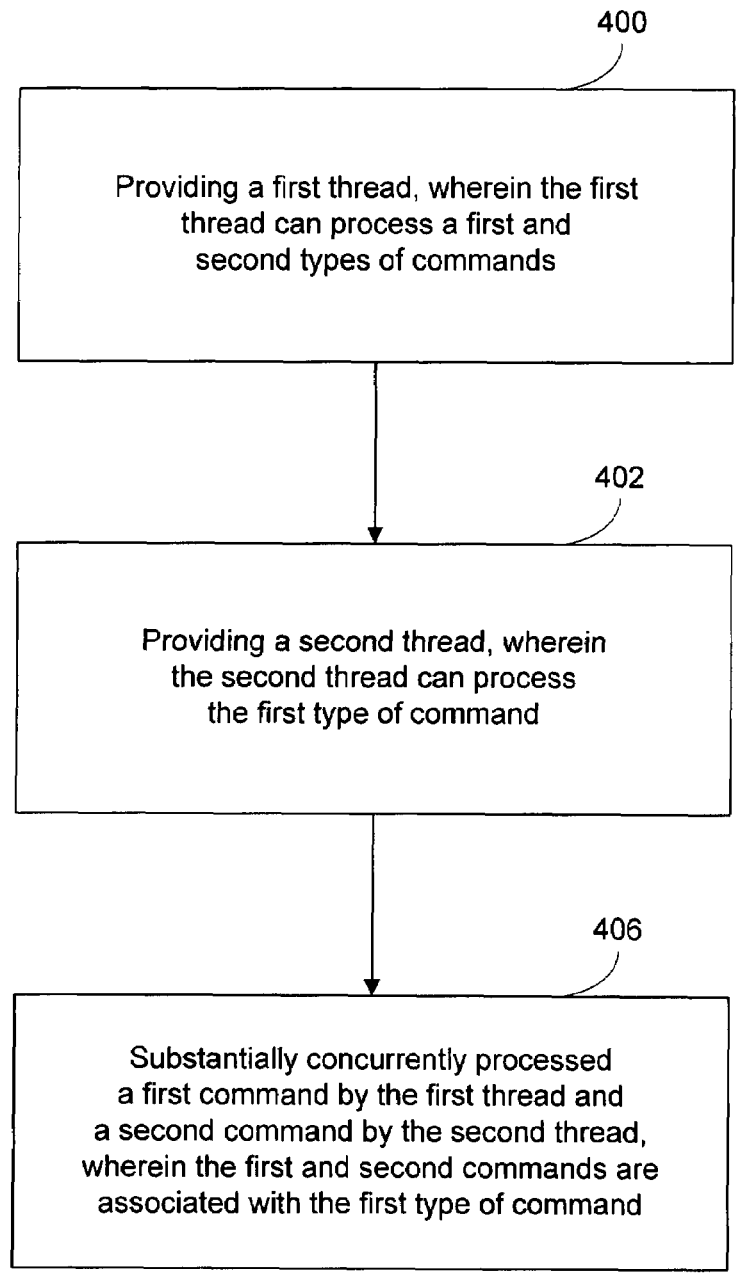
FIG. 4 is yet another flow diagram of a method according to an embodiment of the present invention for transferring data.

FIG. 4 is yet another flow diagram of a method according to an embodiment of the present invention for transferring data. In this example, a first thread is provided, wherein the first thread can process first and second types of commands (400). A second thread is also provided, wherein the second thread can process the first type of command (402). A first command is processed by the first thread substantially concurrently with a second command being processed by the second thread, wherein the first and second commands are associated with the first type of command (406).

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system for transferring data associated with a real-time data replication system comprising:
    a processor configured to use a main thread, wherein the main thread can process a synchronization command and a dynamic replication command; also configured to provide a synchronization thread, wherein the synchronization thread can process the synchronization command but not the dynamic replication command; wherein the synchronization thread is configured to process a synchronization command substantially concurrently with the processing by the main thread of a synchronization command and wherein the synchronization thread is configured to not process a synchronization command at a time when the main thread is processing a dynamic replication command; and a memory coupled to the processor for providing the processor with instructions.

2. The system of claim 1 wherein the main thread, the synchronization thread, or both process commands from a kernel cache.

3. The system of claim 2 wherein the synchronization thread skips commands in the kernel cache that have been or are being processed by other threads until it finds a synchronization command that has not yet been and is not currently being processed by another thread.

4. The system of claim 2 wherein when the synchronization thread does not move ahead of the main thread unless the main thread is performing a synchronization command.

5. The system of claim 2 wherein if a synchronization thread does not encounter synchronization commands in the kernel cache, the synchronization thread closes after a time interval.

6. The system of claim 1 wherein the main thread does not process dynamic replication types of commands unless all synchronization threads that are executing synchronization commands are completed.

7. A method for transferring data associated with a real-time data replication system comprising:

using a main thread, wherein the main thread can process a synchronization command and a dynamic replication command; and providing a synchronization thread, wherein the synchronization thread can process the synchronization command but not the dynamic replication command;

wherein the synchronization thread is configured to process a synchronization command substantially concurrently with the processing by the main thread of a synchronization command and wherein the synchronization thread is configured to not process a synchronization command at a time when the main thread is processing a dynamic replication command.

8. The method of claim 7 wherein the main thread, the synchronization thread, or both process commands from a kernel cache.

9. The method of claim 8 wherein the synchronization thread skips commands in the kernel cache that have been or are being processed by other threads until it finds a synchronization command that has not yet been and is not currently being processed by another thread.

10. The method of claim 8 wherein when the synchronization thread does not move ahead of the main thread unless the main thread is performing a synchronization command.

11. The method of claim 8 wherein if a synchronization thread does not encounter synchronization commands in the kernel cache, the synchronization thread closes after a time interval.

12. The method of claim 7 wherein the main thread does not process dynamic replication types of commands unless all synchronization threads that are executing synchronization commands are completed.

13. A computer program product for transferring data associated with a real-time data replication system, the computer program product being embodied in a computer readable medium and comprising computer instructions for:

using a main thread, wherein the main thread can process a synchronization command and a dynamic replication command; and providing a synchronization thread, wherein the synchronization thread can process the synchronization command but not the dynamic replication command;

wherein the synchronization thread is configured to process a synchronization command substantially concurrently with the processing by the main thread of a synchronization command and wherein the synchronization thread is configured to not process a synchronization command at a time when the main thread is processing a dynamic replication command.

14. The computer program product recited in claim 13 wherein the main thread, the synchronization thread, or both process commands from a kernel cache.

15. The computer program product recited in claim 14 wherein the synchronization thread skips commands in the kernel cache that have been or are being processed by other threads until it finds a synchronization command that has not yet been and is not currently being processed by another thread.

16. The computer program product recited in claim 14 wherein when the synchronization thread does not move ahead of the main thread unless the main thread is performing a synchronization command.

17. The computer program product recited in claim 14 wherein if a synchronization thread does not encounter synchronization commands in the kernel cache, the synchronization thread closes after a time interval.

18. The computer program product recited in claim 13 wherein the main thread does not process dynamic replication types of commands unless all synchronization threads that are executing synchronization commands are completed.

* * * * *